June 9, 1925. 1,540,837
L. J. HEDDERICH
FISHING REEL AND MOUNT
Filed June 18, 1924
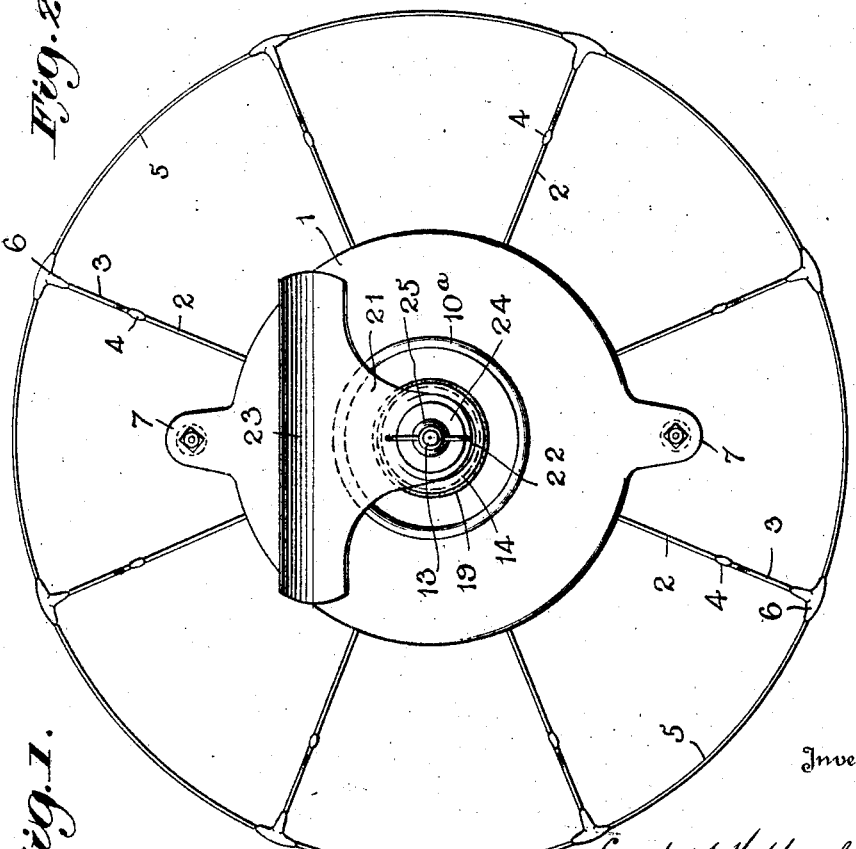

Patented June 9, 1925.

1,540,837

UNITED STATES PATENT OFFICE.

LEANDER J. HEDDERICH, OF MULBERRY, INDIANA.

FISHING REEL AND MOUNT.

Application filed June 18, 1924. Serial No. 720,800.

*To all whom it may concern:*

Be it known that I, LEANDER J. HEDDERICH, a citizen of the United States, residing at Mulberry, in the county of Clinton and State of Indiana, have invented certain new and useful Improvements in Fishing Reels and Mounts, of which the following is a specification.

My invention relates to fishing or casting reels, and to the means for mounting the same upon a rod.

Among the objects of the invention are to provide a gearless reel of large size but extremely light construction, which shall run freely and easily when required, and on which the line may be speedily and readily rewound; to provide an improved thumbing drum to enable the angler to exert a suitable drag on the reel when playing a fish, or when casting, such drum being associated with a novel form of adjustable friction brake; and to devise improved means for mounting the reel spindle on the rod, whereby the thumbing drum may be brought into a position best suited to the hand of any individual user, and whereby the angular relation between reel and rod may be adjusted, as desired. Further objects and advantages will appear from the following description, and the novel features of the invention will be pointed out in the appended claims.

In order that the invention may be clearly understood, reference is had to the accompanying drawing, forming part of this specification, and in which:—

Fig. 1 is a side elevation of my improved reel and mount viewed from the side adjacent the rod;

Fig. 2 is an edge elevation thereof, parts being shown in section and the rod being indicated in dotted lines;

Fig. 3 is a face view of one of the friction discs hereinafter described, parts being shown in section; and Fig. 4 is a transverse section on an enlarged scale, showing the supporting bracket and universally adjustable mounting.

Referring to the drawings in detail, my improved reel preferably comprises a central hub 1, formed of sheet metal, and a series of spokes 2, radiating therefrom. Each of these spokes is formed of two pieces of wire, the two pieces being united at 4, at a suitable distance from the hub, and the ends of the pieces of wire beyond the point 4 being spread apart, as indicated at 3, to form a line-receiving channel or groove. To the tips of the wire spokes on each side is secured a wire guard ring 5, by means of soldered connections 6.

The above described reel structure is exceedingly light and rigid, and is admirably adapted for use as a fishing reel, since it not only turns with small effort and enables the line to be speedily rewound, but furthermore, it permits the line to quickly dry when wound thereon in a wet condition. No claims are specifically directed, in this case, to the reel structure per se, such structure forming the subject matter of my co-pending application, Serial No. 720,799, filed of even date herewith.

At the opposite sides of the hub 1 are projections 7, to which are attached suitable cranks or handles 8, two being employed at opposite sides of the center, as usual, in order to balance the reel.

Rigidly secured to and projecting laterally from one face of the hub 1 is a thumbing drum 9, preferably formed of sheet metal and of double bell shape, as shown in Fig. 2. The outer end of this drum is sharply flared to form an inclined concave surface, as indicated at 10, the extreme edge being rolled into a smooth bead, as shown at 10$^a$.

A partition wall 11 extends across the interior of the thumbing drum, and set into an opening in this wall and into a corresponding opening in the front wall of the hub is a journal box or sleeve 12.

The reel above described, is mounted for free rotation upon a spindle 13, such spindle extending beyond the face of the hub at one side, and beyond the end of the thumbing drum, at the other side. The rear end of the spindle is threaded, as shown at 13$^a$, and screwed up tight on this threaded portion is a nut or collar 15. This collar is forced on the threaded end of the shaft until it becomes firmly fixed thereto.

A disc 14 surrounds the spindle 13, adjacent the nut 15, and is provided with a central opening fitting loosely over a flattened portion 16, projecting from the end of the nut 15, and rests against shoulders 17, formed at the base of the flattened portion 16. From an inspection of this construction, it will be evident that the disc 14 is locked to the shaft or spindle 13, so as to be held against rotation, but owing to its relatively loose fit over the neck or flattened portion 16, it is capable of a slight angular or pivotal movement. This is for the purpose of enabling it to accommodate itself to the plane of the partition wall or disc 11, when the two are forced together, as hereinafter described.

The rear end of the nut 15 is enlarged and shaped to form a concave spherical socket 18, constituting one member of a universal joint for supporting the spindle.

Interposed between the stationary disc 14 and the disc 11, which rotates with the thumbing drum, is a friction disc 19, of soft material such as leather, and this causes a frictional drag or braking effect on the drum when the disc 11 is forced into engagement with the disc 19. A knurled nut 20 is fitted on the threaded front end of the spindle 13, as shown in Fig. 2, and bears against the sleeve 12, so that the friction due to the engagement of the discs above described may be regulated by loosening or tightening such nut.

21 designates the supporting base or bracket on which the reel is mounted. This bracket has a concave elongated rod engaging portion 23, adapted to be secured to a rod X, and a laterally extending offset portion which terminates in a spherically shaped part or "ball" 22, of substantially the same curvature as the socket 18 and adapted to fit within the same. The spherical part or ball 22 is provided with a central opening 22ª, adapted to fit over the spindle 13, but considerably larger than the diameter of said spindle, so as to allow freedom of movement. A suitable washer 24 fits loosely over the spindle 13, and engages the hollow interior of the ball-shaped portion 22, and a clamping nut 25, shown as a wing nut, engages the threaded end 13ª of the spindle, and serves to clamp the above mentioned parts together. The supporting member or bracket 21 is preferably pressed from sheet metal, as shown.

The above method of mounting produces several important results. In the first place, from an inspection of Figure 2, it will be seen that the spindle 13, about which the reel rotates, is offset from the rod X, and under normal conditions, located below the same. In other words, the axes of the reel and rod do not intersect. In the second place, the above described construction provides a universal mounting for the reel. By loosening the nut 25, it is obvious that the spindle 13, carrying the reel, may be angularly adjusted in all directions and that when adjusted to the proper angle, it may be clamped in adjusted position by means of the nut 25. Thus, not only can the reel be so set as to receive the line centrally, but it can also be adjusted to accommodate the size of the hand of the individual user, or to conform to his particular idea as to convenience.

When in use, as for example, in casting the operator grasps the rod adjacent the reel as usual, and when his hand is in this position, it will be seen that the thumb closes down naturally upon the thumbing drum and readily engages the concave surface 10 thereof. Therefore, when it is desired to exert a drag on the reel to retard the rotation thereof, the fisherman exerts a slight pressure on the drum with his thumb. This not only has the usual retarding effect, due to friction of the thumb against the drum, but, owing to the shape of the surface 10, it tends to shift the reel axially along the spindle and produces an end thrust of the drum which forces the friction disc 11 into engagement with the friction disc 19, and this causes a greatly augmented braking effect. Thus, it will be seen that by the simple construction shown, I have provided means whereby a very efficient double braking action can be produced by the simple pressure of the thumb.

It will be further observed that the friction discs are housed on the inside of the drum where they are practically concealed and protected. At the same time, they become readily accessible by simply unscrewing the nut 20 and removing the reel from the spindle.

It will be particularly noted that the above described angular adjustment of the reel relative to the rod may be accomplished without tools of any kind and without removing the reel from the rod, by simply loosening the wing nut 25. This wing nut is practically concealed and protected by the supporting bracket.

From the above, it is obvious that I have provided a novel and efficient reel and reel mount having many points of superiority, and it is thought that its numerous advantages will be apparent to those skilled in the art, without further discussion.

What I claim is:—

1. The combination with a fishing reel, of a thumbing drum forming a part thereof, a spindle on which said reel and drum are mounted, for both rotation and slight axial movement, co-operating friction members fixed to said spindle and drum, respectively, the surface of said drum being flaring or bell-shaped at the end, so that pressure of the thumb on such surface tends to shift the drum axially, whereby the said friction members are forced together, and a double breaking effect produced.

2. The combination with a fishing reel, of a thumbing drum forming a part thereof, a spindle on which said reel and drum are mounted, a pair of friction members one of which is rigid with said drum and the other of which is stationary, and means whereby the natural pressure of the thumb upon said drum serves to force said friction members together, whereby a double braking action is produced.

3. In a fishing reel, the combination with a suitable support, of a fixed friction disc carried thereby, a co-operating disc carried by said reel, and means for forcing said discs together to produce a braking action, one of said discs being pivotally supported adjacent its center so as to be capable of slight transverse angular movement, whereby it may adjust itself to the plane of the other disc.

4. The combination with a fishing reel, of means for so mounting the same on a rod, that, when the rod is held in a horizontal position, the reel will lie in a substantially vertical plane wholly at one side of the rod, with its axis below said rod, and a thumbing drum carried by said reel at the side thereof adjacent the rod.

5. In a fishing reel, the combination with a supporting base or bracket having a portion adapted to engage a rod, and an off-set portion projecting from said rod engaging portion, of a reel spindle carried by said offset portion, a reel journaled on said spindle, and a thumbing drum fixed to said reel and located between the same and said bracket.

6. In a fishing reel mount, the combination with a supporting base or bracket having a portion adapted to engage a rod, and an offset portion projecting from said rod engaging portion, of a reel spindle carried by said offset portion, said reel spindle and offset portion having nested concentric convex and concave surfaces and means for clamping said surfaces in frictional engagement, whereby said spindle is universally angularly adjustable relative to the bracket.

7. In a fishing reel mount, the combination with a rod engaging bracket, of a reel spindle, cooperating convex and concave elements carried by said bracket and spindle, and adjustable means for clamping said elements together with said spindle at any one of a number of different angles to said bracket.

8. In a fishing reel mount, the combination with a rod engaging bracket, of a reel spindle, and co-operating spherical parts carried by said spindle and bracket respectively, and constituting a universal joint uniting said elements.

9. In a fishing reel mount, the combination with a rod engaging bracket, of a reel spindle, a rounded part carried by one of said elements, a co-operating socket carried by the other element, whereby the angular relation of the elements may be varied as desired, and means for clamping the elements in adjusted position.

10. In a fisihng reel mount, the combination with a supporting bracket having a portion adapted to engage a rod, and an off-set portion projecting from said rod engaging portion, of a reel spindle, and cooperating elements carried by said spindle and off-set portion of the bracket constituting a universal joint, said spindle having its end threaded and extending through an opening in said offset portion, and a thumb nut screwed onto said threaded end of the spindle and serving to clamp said elements together, whereby the angular relation of the reel to the bracket and rod may be universally adjusted, as desired, by manipulating said nut, without removing the reel from the rod.

In testimony whereof I affix my signature.

LEANDER J. HEDDERICH.